United States Patent
French

[19]

[11] Patent Number: 6,003,261
[45] Date of Patent: Dec. 21, 1999

[54] REMOTE DEER DECOYING DEVICE

[76] Inventor: Norman Stinson French, P.O. Box 561, Hayes, Va. 23072

[21] Appl. No.: 08/493,494

[22] Filed: Jun. 22, 1995

[51] Int. Cl.⁶ .................................................. A01M 31/04
[52] U.S. Cl. ................................ 43/1; 446/397; 446/402; D10/116
[58] Field of Search ......................... 43/1, 2, 3; 446/421, 446/418, 413, 417, 397, 402, 404, 213, 192; D10/116; D22/125

[56] References Cited

U.S. PATENT DOCUMENTS

| | | | |
|---|---|---|---|
| 2,515,023 | 7/1950 | Thompson et al. | 46/189 |
| 3,100,948 | 8/1963 | Tax | 46/189 |
| 3,137,092 | 6/1964 | Salerno | 446/397 |
| 4,606,733 | 8/1986 | Willis | 446/397 |
| 4,610,641 | 9/1986 | Allen | 446/397 |
| 4,836,822 | 6/1989 | Finley et al. | 446/397 |
| 4,846,753 | 7/1989 | Langston | 446/397 |
| 4,850,928 | 7/1989 | Stewart | 446/397 |
| 4,862,625 | 9/1989 | Dolan | 43/1 |
| 4,932,920 | 6/1990 | Hearn | 446/397 |
| 5,019,008 | 5/1991 | Hughes | 446/207 |
| 5,029,408 | 7/1991 | Smith | 43/1 |
| 5,148,621 | 9/1992 | Rosen | 43/1 |
| 5,158,494 | 10/1992 | Ball | 446/397 |
| 5,334,074 | 8/1994 | Suminski | 446/418 |
| 5,380,235 | 1/1995 | Forbes et al. | 446/397 |
| 5,402,102 | 3/1995 | Lachance | 446/397 |
| 5,503,585 | 4/1996 | Heineman | 43/2 |
| 5,555,664 | 9/1996 | Shockley | 43/1 |

OTHER PUBLICATIONS

Bass Pro Shops, Hunting Sale Catalog, 1995, p. 173, Johnny Stewart Game Caller.

*Primary Examiner*—Joseph J. Hail, III
*Attorney, Agent, or Firm*—Moore, Foard & Dias; Richard M. Foard

[57] ABSTRACT

A device for remotely decoying deer by imitating the sound of deer antlers clashing, comprised of a housing having a movable striker mounted therein. The housing is provided with a series of protrusions which are in interfering contact with the striker and mimic the sound of clashing antlers when contacted by the striker. The striker is provided with a pull line for remotely actuating the striker and with a spring for returning the striker to its pre-actuated position. The present invention may also be provided with a hinge for aligning the device with the direction of pull, a cover for shielding any movement within the device and a cannister for deploying deer scent.

14 Claims, 5 Drawing Sheets

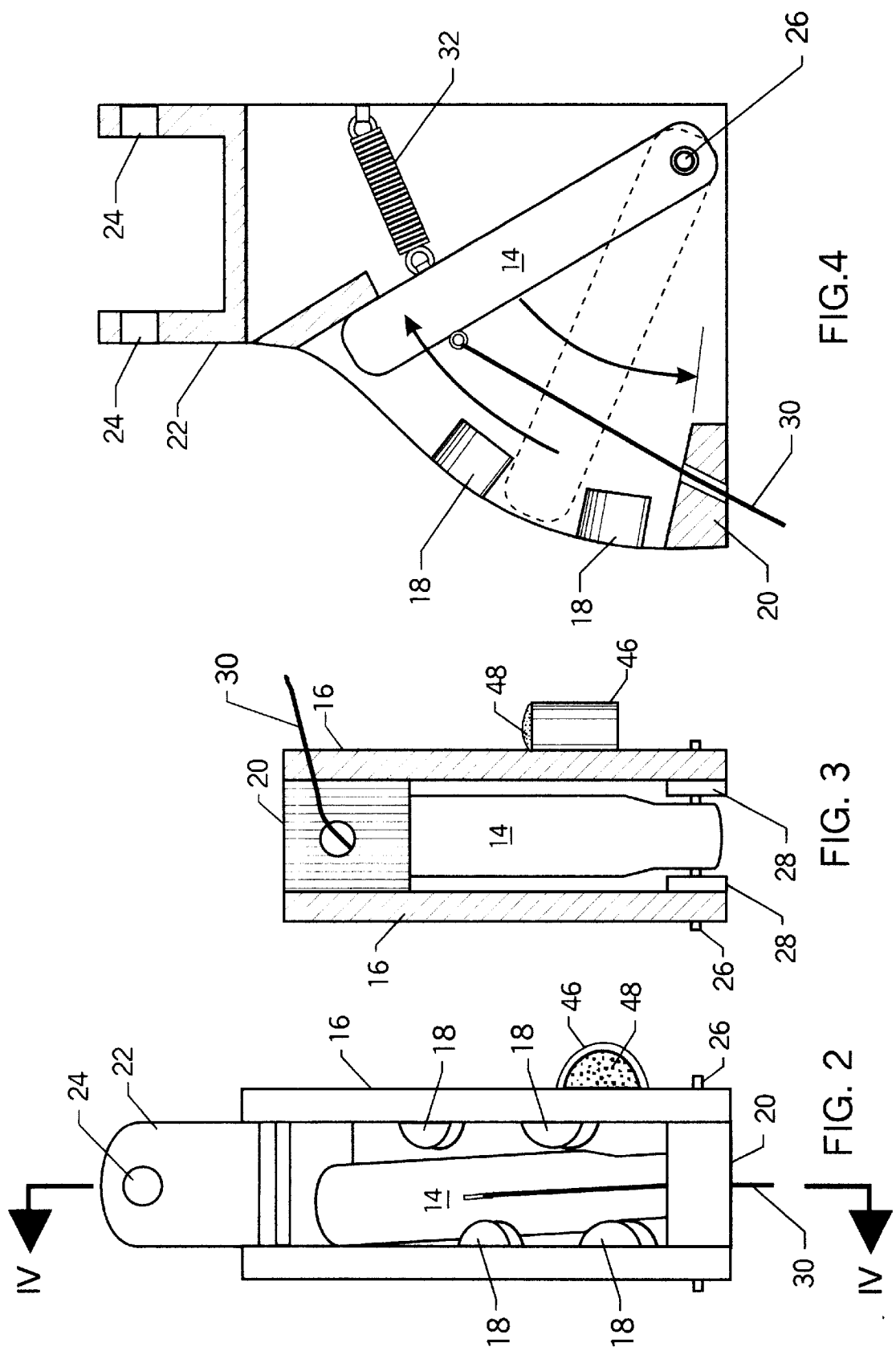

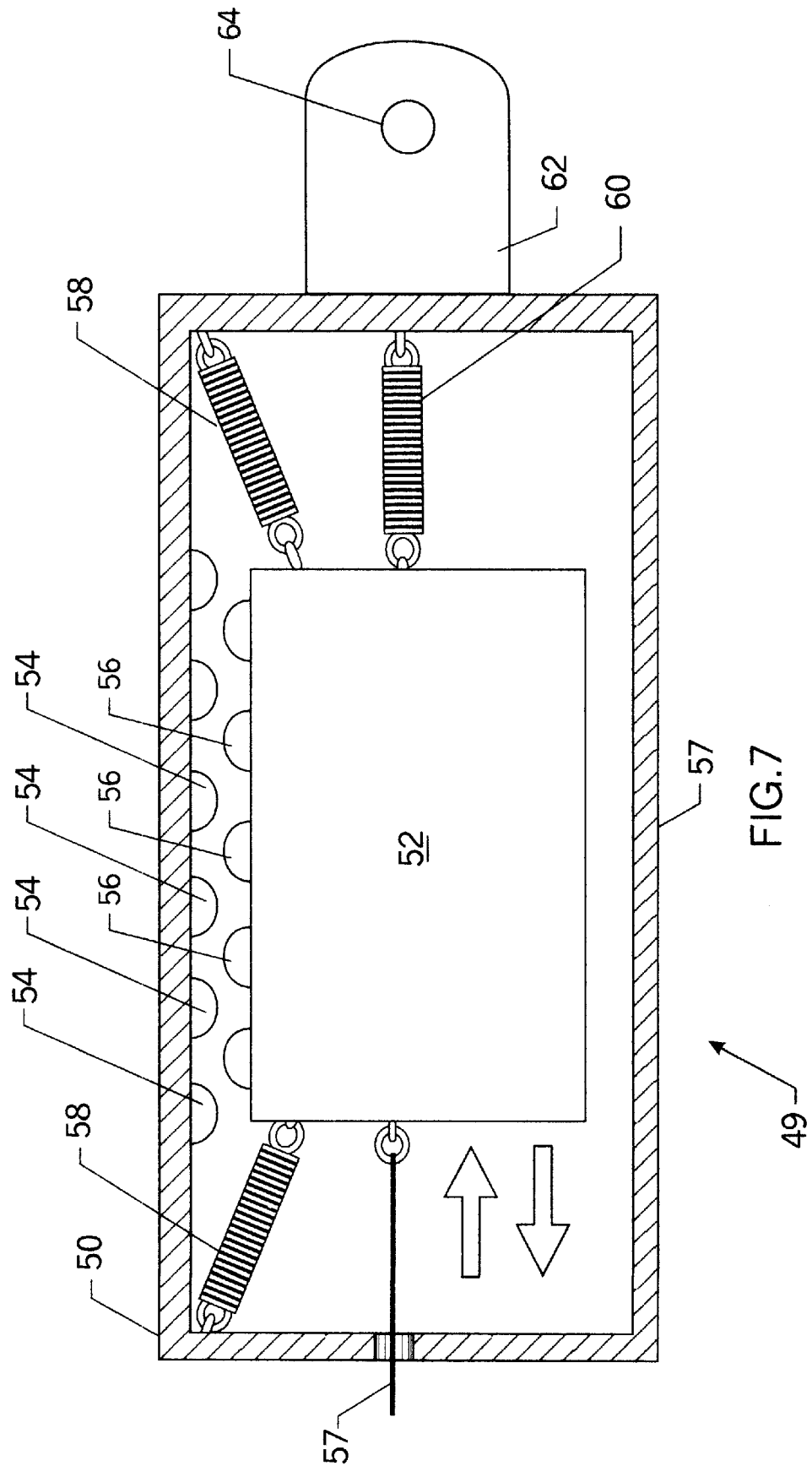

REMOTE DEER DECOYING DEVICE

BACKGROUND OF THE INVENTION

The present invention relates generally to a device for remotely decoying deer when hunting by imitating the sound of deer antlers clashing. The invention provides for producing the sound of antlers clashing at a location remote from the location of the hunter in order to maximize the hunter's chance of intercepting any deer investigating the sound.

Deer hunting generally takes place during the fall of the year and oftentimes the deer hunting season is timed to coincide with the mating season of deer. During the mating season, male deer often compete with one another for territory and females with which to mate. In the process of competing for mates, male deer frequently will fight by locking antlers with one another and pushing and thrusting in order to demonstrate dominance. During the mating season, or "rut" as it is more commonly called, male deer in any given territory are very sensitive to intrusion by other males and are disposed toward investigating any competition among other males which takes place in their territory.

Deer in general, and particularly white tailed deer, are very wary by nature. This is particularly true of the more mature male deer who have survived several seasons of hunting pressure and competition for food and mates by virtue of their wits and instincts. In surviving in the wild, deer rely on sight, sound and primarily smell. It is an observable basic instinct of deer to maneuver themselves into a downwind position so as to be able to scent any activities which they wish to investigate. Accordingly, when male deer are investigating what they believe to be contest among other males for territory and mates, their first instinct is to approach such a conflict from a downwind position to learn more about the situation via scent before approaching the contestants.

One time honored means of attracting deer to a hunter is to imitate the sound of a deer contest by clashing or "rattling" antlers together. This may be accomplished with the use of real antlers or imitation antlers. Most often such rattling is accomplished by a hunter holding an antler in each hand and striking the same together in a measured pattern. Unfortunately, when such a rattling takes place, most deer investigating the same will approach from a downwind position and will smell the hunter creating the rattling noises, perhaps even before the hunter has a chance to see the investigating deer. This is particularly true of the larger, more wary and generally more desirable male deer.

As can be seen from the above discussion, it is therefore desirable to be able to imitate the sound of clashing antlers in a position upwind from the hunter so as to maximize the hunter's chance of intercepting any additional male deer which may investigate the sound. It is also desirable for a hunter to be able to position himself remotely from any movement associated with producing the sound of clashing antlers, so as not to draw the attention of his quarry to him. It is also desirable to imitate the odor of contesting male deer in addition to the sounds produced by such a contest. Accordingly, for these and other reasons, the need exists for a device to remotely decoy deer in order to maximize a hunter's success and chances of bagging a trophy animal.

SUMMARY OF THE INVENTION

It is therefore an object of the present invention to develop a device for remotely decoying deer.

It is another object of the present invention to provide for the production of the sound of clashing antlers at a position upwind or crosswind from the hunter.

It is another object of the present invention to provide a means of shielding the movement associated with decoying from view.

Yet another object of the present invention is to provide additional means for mimicking the scent associated with the contest between male deer for territory and mates.

According to one embodiment of the present invention, the foregoing and other objects are obtained by providing a device for remotely decoying deer and having an arcually moveable striker disposed between two panels comprising the sides of the device, which panels are provided with internal protrusions which are in interfering contact with said arcually moveable striker. Said arcually moveable striker is provided with a pull line for actuating said striker at a remote distance and is further provided with a spring or elastic band for returning the striker to its pre-actuated position after said pull line is activated and released. The device can be further provided with pivot means for aligning with additional cover means for hiding from view the movement associated with operating the device. Additionally, the device can be provided with a container having wicking material therein saturated with one of various scents associated with male deer.

BRIEF DESCRIPTION OF DRAWINGS

FIG. 2. is a top view of a device constructed according to the present invention.

FIG. 3. is an end view of a device constructed according to present invention.

FIG. 4. is a cross-sectional view along line IV—IV of FIG. 2.

FIG. 7. is a schematic, cross-sectional view of an alternate embodiment of the present invention.

DESCRIPTION OF THE PREFERRED EMBODIMENT

Figure 1:
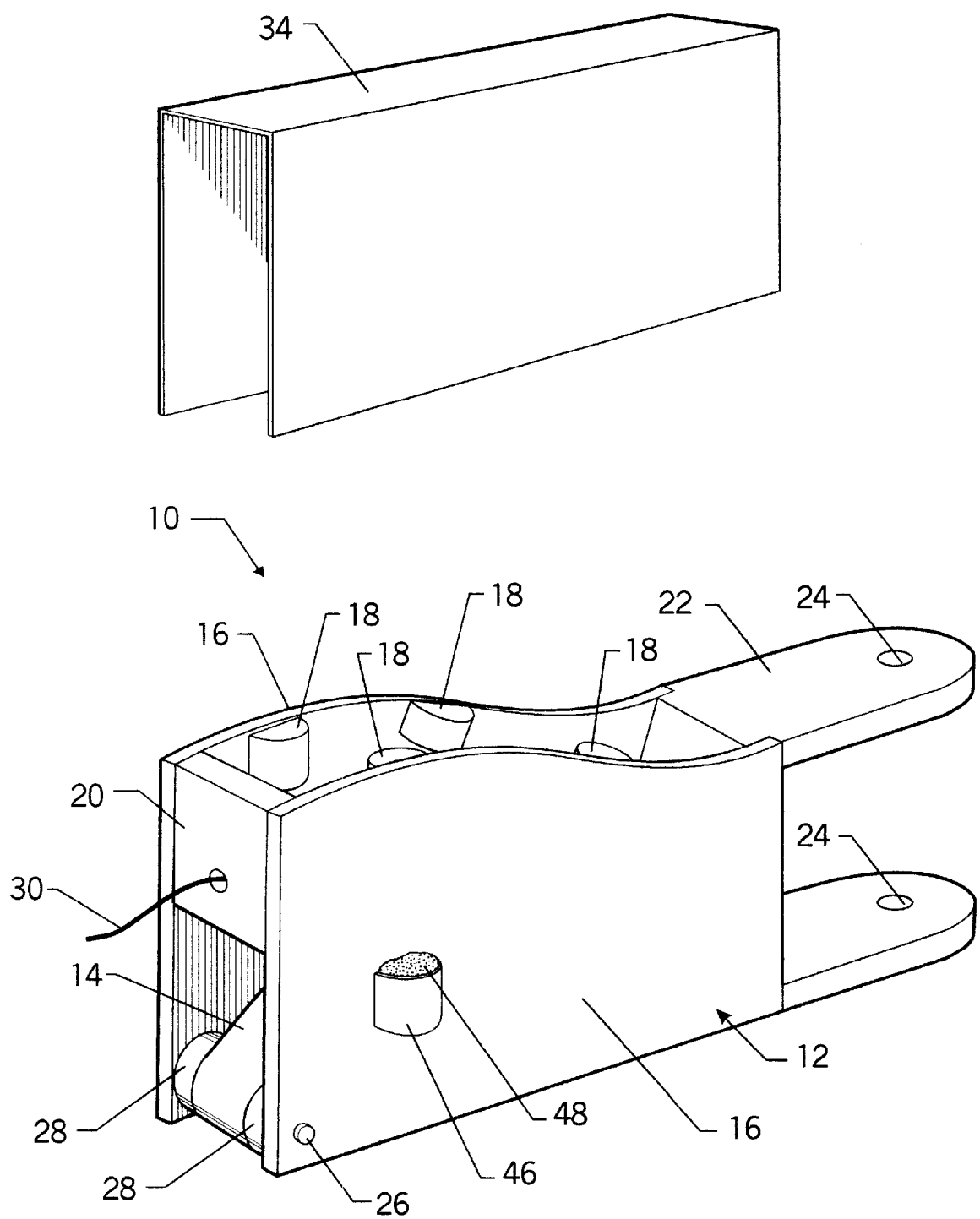
FIG. 1. is a three dimensional perspective view of a device for remotely decoying deer constructed according to the present invention.

Referring now to the drawing wherein like referenced characters designate identical or corresponding parts, and more particularly to FIG. 1, there is shown a perspective view of the present invention, designated generally by the reference numeral 10, which is comprised basically of a housing, designated generally by the reference numeral 12, and a moveable striker 14. Housing 12 is comprised of a plurality of sides 16, which serve to transmit the sound produced by the device, having a plurality of semi-circular protrusions 18 disposed along the inner surface thereof in a staggered, generally arcual manner. Sides 16 are separated by a spacer 20 and a pair of hinges 22, having a plurality of linearly aligned gudgeon holes 24 therein for pivotally mounting the device. Striker 14 is pivotally mounted on an axle 26 and is provided with spacers 28 to prevent striker 14 from coming into contact with the inner surfaces of sides 16.

Spacers 28, axle 26 and the hole at the lower end of striker 14 through which axle 26 passes are sized so as to allow a significant amount of wobble in striker 14 as it is moved angularly around axle 26.

Referring now also to FIG. 2, it can be seen that semi-circular protrusions 18 and striker 14 are sized such that striker 14 is in interfering contact, in an alternating fashion, with protrusions 18 as striker 14 is moved angularly from its rest position to its fully actuated position. The interfering contact of striker 14 with semi-circular protrusions 18 imitates the sound of deer antlers clashing as the animals fight. As hereinabove mentioned, the loose fit between striker 14, spacers 28 and axles 26 allows striker 14 to wobble back and forth between protrusions 18 on each side of the device, thereby striking protrusions 18 in an alternating fashion.

Pull line 30 is attached to striker 14 in any workable fashion and is utilized to actuate striker 14 from a distance remote from the site of the present invention. Striker 14 as further provided with a spring, elastic band or other workable equivalent 32 which operates to return the striker 14 to its rest position after the same is actuated by a pull on pull line 30.

It should be noted that sides 16 serve the dual purpose of transmitting and amplifying the sound produced by the interfering contact between striker 14 and protrusion 18 as well as act to shield the movement of striker 14 from view by the animals sought to be decoyed. It should also be noted that side 16 may be made larger than is necessitated by the arc of movement of striker 14 in order to provide additional sound amplification or to provide additional visual shielding. Furthermore, the present invention can be provided with a cover 34 to further enhance the visual shielding when the present invention is actuated.

As shown in FIGS. 1–4 in the preferred embodiment, striker 14 is generally cylindrical in shape and is a solid body, and protrusions 18 are solid, semi-cylinders. Since it may be desirable to produce rattling sounds of differing pitches, tones and volume, it should be noted that strikers 14 and protrusions 18 and sides 16 may be fabricated in various shapes and sizes and made of various materials such as wood, plastics, metals and combinations thereof. It should also be noted that the sound produced by the present invention may be altered by making either or both striker 14 and protrusions 18 hollow. Representative additional desirable shapes for striker 14 and protrusions 18 are shown in FIGS. 8A through 8D and FIGS. 9A through 9D respectively.

Figure 6:
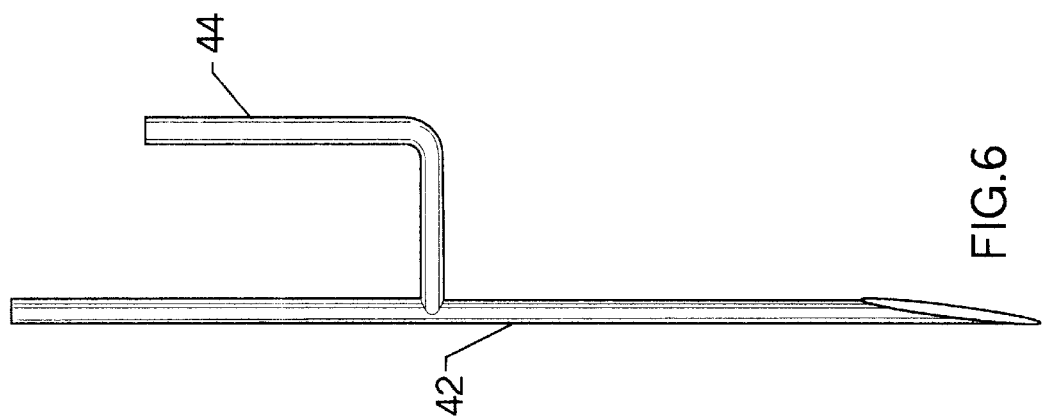
FIG. 6. is a side view of a mounting stake of the present invention.
Figure 5:
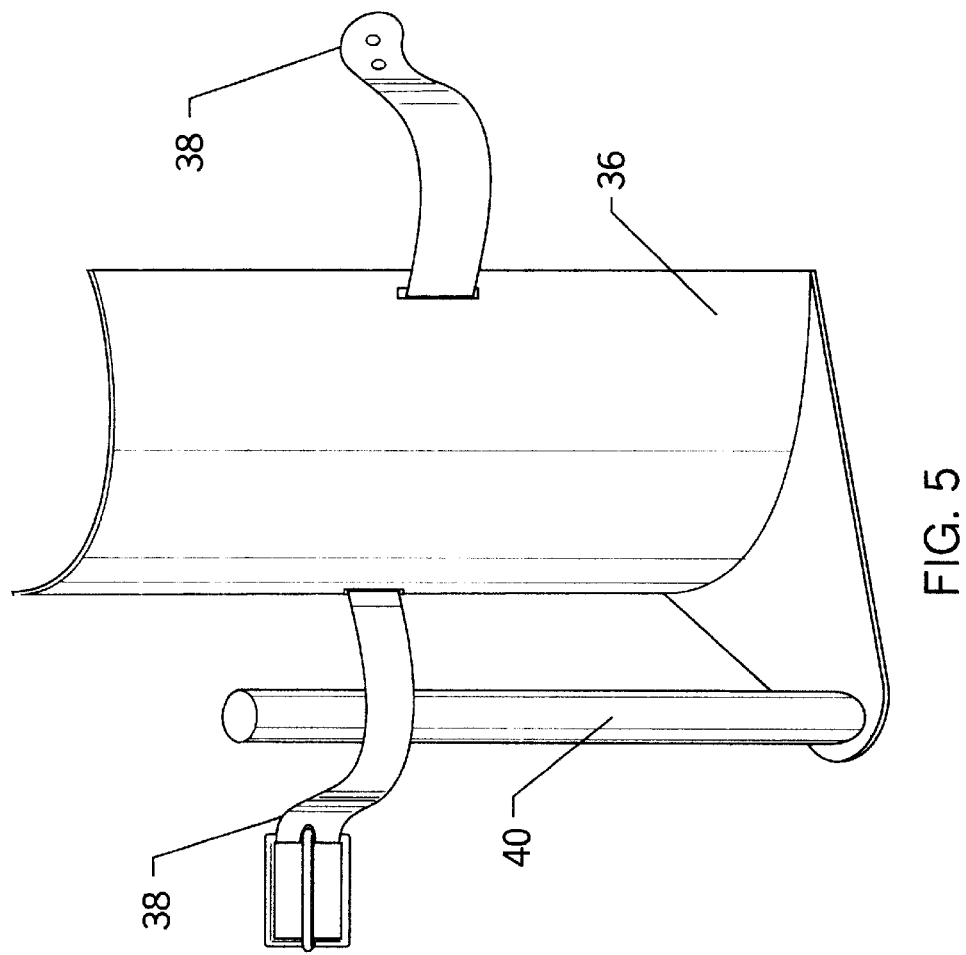
FIG. 5. is a schematic view of the mounting bracket of the present invention.
Figures 8A, 8B, 8C, 8D:
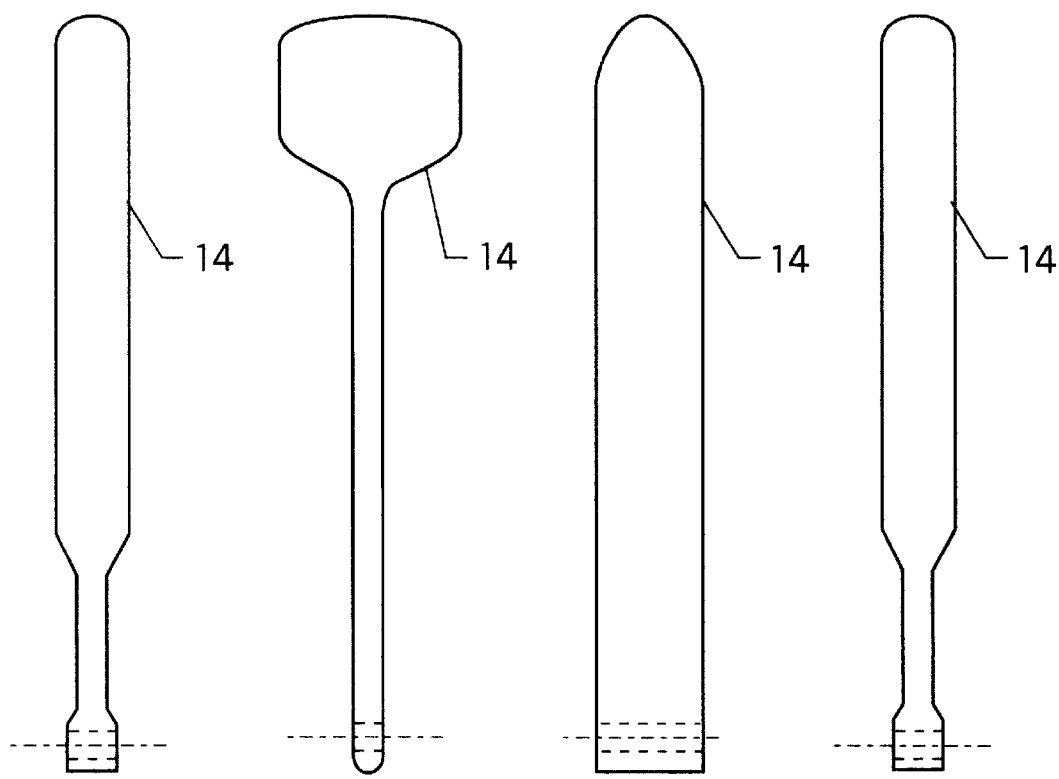
FIG. 8A through FIG. 8D are side views of various embodiments of a component of the present invention.
Figures 9A, 9B:
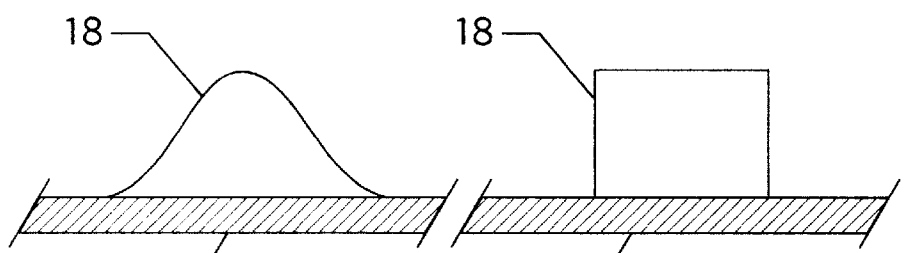
FIG. 9A through FIG. 9D are fragmentary views of various embodiments of a component of the present invention.
Figures 9C, 9D:
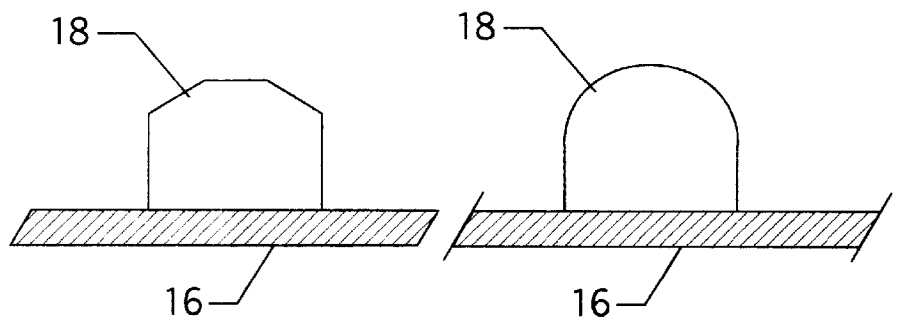

In operation, it would be desired that the present invention be mounted generally upwind of the hunter's location and generally aligned with the direction of pull on the pull line 30. To that end, as shown in FIG. 5, the present invention may be provided with a mounting bracket 36 having one or more straps 38 and a pintle 40 for pivotally engaging gudgeon holes 24 so as to enable the present invention to be generally self aligning with the direction of pull along pull line 30. Straps 38 may be used to mount bracket 36 to any convenient fixed object, such as a tree, fence post, stake or the like. In addition, the present invention may be pivotally mounted upon a stake 42 which could either serve as its own pintle, or be provided with a separate pintle 44 as shown in FIG. 6. The present invention may also be provided with a ball joint or other universal joint in place of a hinge in order to aline the device with the direction of pull applied to the pull line 30. It is desirable that any hinge, ball joint or universal joint used to accomplish alinement have sufficient friction to enable the device to hold its alined position without excessive additional movement.

As deer are generally very wary animals, it may well be necessary that pull line 30 for actuating the present invention be routed in such a manner as to not been seen or contacted by any approaching deer. To this end, pull line 30 may be routed through dead eyes (not shown), or pulleys (not shown) which would in turn be attached to the earth and vegetation, to the hunter's location.

It should also be noted that the present invention may be remotely actuated, where legal, through electrical and electronic means such as a solenoid (not shown) connected to striker 14 and by providing a battery pack, or other power source (not shown) for the device. The present invention could then be actuated via a remote switch connected by wire to the present invention or even by means of a radio controlled switch.

The present invention may also be provided with a container 46 mounted on the side thereof which may be filled with wicking material 48. Wicking material 48 serves to store and disseminate commercial deer hunting odor products such as buck urine, musk odor and the like. By utilizing such a scent producing container, the hunter would be enabled to imitate the smell of fighting deer in addition to the sounds which they make.

Referring now to FIG. 7., there is shown an alternate embodiment of the present invention. The housing of the alternate embodiment, designated generally by the number 49, consists of a hollow, generally rectangular prismatic housing 50 having a linearly slidable striker 52 slidably disposed therein. One inner surface of housing 50 is provided with a plurality of semi-cylindrical protrusions 54 and the opposing external surface of striker 52 is provided with a further plurality of semi-cylindrical protrusions 56. In the alternate embodiment of the present invention, the sound of deer antlers clashing is produced by the interfering contact between protrusions 54 and 56 as transmitted and amplified by the sides of housing 50. Striker 52 is further provided with a pull line 57 for actuating striker 52 from a remote location.

As in the first embodiment of the present invention, the alternate embodiment may be constructed of various materials. Additionally, protrusions 54 and 56 may be constructed in any workable shape in order to produce the desired sound. Representative shapes for protrusions 54 and 56 are shown in FIGS. 9A through 9D. It is evident from FIG. 7. that there must be ample clearance between striker 52 and its protrusions 56 and housing 50 and its protrusions 54 to enable striker 52 to be linearly actuated within housing 50, and there must also be interfering contact between protrusions 54 and 56 in order to produce the desired sounds. To this end, striker 52 is provided with a plurality of springs or elastic bands 58 for purposes of holding striker 52 and its protrusions 56 in interfering contact with protrusions 54 in housing 50, yet allowing sufficient clearance to permit the linear translation of striker 52. Striker 52 is further provided with a return spring or elastic band 60 for purposes of returning striker 52 to its pre-actuated position. As may be seen from the first embodiment of the present invention as shown in FIGS. 1–4, the embodiment shown in FIG. 7 is also provided with a boss 62 having a gudgeon hole 64 located therein for purposes of pivotally mounting the invention on a pintle.

The alternate embodiment of the present invention shown in FIG. 7 has several advantages over the embodiment shown in FIGS. 1–4, in that the movement of striker 52 is completely enclosed and thus hidden from view by game animals. Furthermore, because its working parts are completely enclosed, the alternate embodiment is more immune to the effects of damp weather and contamination from forest litter, twigs and the like.

In operation, the present invention would be mounted to a tree, fence post or stake, in such a manner as to allow the hinged mount to provide general alinement between the device and the hunter's position. If desired, the invention could be covered with a cover, as hereinabove shown, or could be masked by brush or other naturally occurring cover. A hunter would generally position himself a suitable number of yards downwind in order to intercept any deer investigating the noise and/or scent produced by the present invention. The invention may be operated by a hunter stationed on the ground or by a hunter taking a tree stand. Depending upon the hunter's position, he may choose to employ a series of dead eyes and/or pulleys to route his pull line away from the path of any potential approaching deer and any interfering vegetation and in such a manner as to place the pull line generally out of sight of a deer. The hunter would then actuate the present invention in any desired cadence so as to best imitate the sound of deer fighting. If the present invention is utilized as hereinabove described, the hunter would then be in a better position to intercept any deer which may approach from the most expected downwind direction.

It should be noted that the present invention can be practiced with many variations of materials, including the use of metals, plastics or other materials in the construction of its various components. Obviously numerous additional modifications of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for remotely decoying deer comprising:
   an arcually moveable cylindrical striker loosely pivotally mounted in a housing on an axle disposed through one end of said striker;
   a housing having at least two parallel planar sides, each provided along the inner surface thereof with a plurality of semi-cylindrical protrusions arranged in a staggered manner in arcs opposed to one another on each side of the plane of motion of said arcually moveable striker, said arcs being roughly concentric with the arc of movement of said arcually moveable striker;
   said axle mounted in said housing roughly perpendicular to both parallel sides of said housing and disposed through said parallel sides of said housing at a point which is concentric with the arcs in which said plurality of semi-cylindrical protrusions are arranged;
   a pull line attached to said arcually moveable striker for remotely actuating said striker;
   a spring affixed to said housing and said arcually moveable striker for returning said striker to its original position after actuation;
   a bracket having adjustable straps for attaching said bracket to a fixed object and having a fixed pintle thereon in pivoting engagement with gudgeon holes on said housing for allowing said housing to align itself with the direction of pull of said pull line.

2. A device for remotely decoying deer comprising:
   a hollow rectangular prismatic housing having a plurality of semi-cylindrical protrusions disposed linearly along one internal surface thereof and alined with the long dimension of said prismatic housing;
   a rectangular prism striker mounted within said housing and slidable with respect thereto along the long dimension of said housing and having a plurality of semi-cylindrical protrusions linearly disposed along that external surface thereof which is opposed to said protrusions on the internal surfaces of said housing;
   a plurality of elastic bands for holding said surface of said striker with protrusions thereon in interfering contact with the opposing internal surface of said housings have protrusions thereon;
   a pull line attached to said slideable striker for remotely actuating said striker;
   a spring affixed to said housing and to said slideable striker for returning said striker to its original position after actuation.

3. A device for remotely decoying deer comprising:
   an arcually moveable striker pivotally mounted in a housing;
   a fixed, arcually disposed series of protrusions in said housing arranged so as to come into interfering contact with said arcually moveable striker when said arcually moveable striker is actuated through its arc of movement; and
   a pull line attached to said arcually moveable striker for remotely actuating said arcually moveable striker.

4. A device for remotely decoying deer as in claim 3 wherein:
   said arcually moveable striker comprises a cylinder loosely pivotally mounted in said housing by means of an axle mounted in said housing and disposed through one end of said cylinder; and
   said fixed protrusions comprise two sets of semi-cylindrical protrusions arranged in a staggered manner in two arcs opposed to one another on each side of the plane of motion of said arcually moveable striker, said arcs being generally concentric with the arc of movement of said arcually moveable striker.

5. A device for remotely decoying deer as in claim 4 wherein:
   said arcually moveable striker is provided with elastic means for returning said striker to its original position after actuation.

6. A device for remotely decoying deer as in claim 4 wherein:
   said semi-cylindrical protrusions are affixed to housing surfaces for transmitting and amplifying the sound produced by the contact between said arcually moveable striker and said semi-cylindrical protrusions.

7. A device for remotely decoying deer as in claim 6 wherein:
   said housing surfaces for transmitting and amplifying the sound produced by the contact between said arcually moveable striker and said semi-cylindrical protrusions comprise planar surfaces forming the sides of said device.

8. A device for remotely decoying deer as in claim 3 further comprising:
   means for automatically aligning said device with the direction of the pull applied to said pull line attached to said arcually moveable striker.

9. A device for remotely decoying deer as in claim 8 wherein:
   said means for automatically aligning said device with the direction of pull applied to said pull line attached to said arcually moveable striker comprises a hinged joint for mounting said device to a fixed object.

10. A device for remotely decoying deer as in claim 9 wherein:

said hinge joint for mounting said device to a fixed object comprises a bracket having a pintle fixedly mounted thereon and provided with adjustable securing straps for attaching said bracket to a fixed object in conjunction with a pair of gudgeon holes in the housing of said device for pivotally engaging said pintle.

11. A device for remotely decoying deer as in claim 9 wherein:

said hinge joint for mounting said device to a fixed object comprises a stake having a pintle mounted thereon in conjunction with a pair of gudgeon holes in the housing of said device pivotally engaging said pintle.

12. A device for remotely decoying deer as in claim 8 further comprising:

cover means for shielding from view any movements of the arcually moveable striker within said device resulting from actuating said pull line attached to said arcually moveable striker.

13. A device for remotely decoying deer comprising:

a linearly moveable striker comprised of a generally rectangular prism and having a plurality of semi-cylindrical protrusions linearly disposed along one external surface thereof, said protrusions being generally aligned with the direction of movement of said linearly moveable striker; and an outer housing comprised of a hollow, generally rectangular prism having said linearly moveable striker slidably mounted therein and provided with a plurality of fixed semi-cylindrical protrusions linearly alined along one internal surface thereof in general alignment with the direction of movement of said linearly moveable striker and opposed to the protrusions on said linearly moveable striker; and a pull line attached to said linearly moveable striker for remotely activating said linearly moveable striker; and further provided with elastic means for holding the semi-cylindrical protrusions on said linearly moveable striker in interfering contact with the fixed semi-cylindrical protrusions on the internal surface of said housing.

14. A device for remotely decoying deer comprising:

an arcually moveable cylindrical striker loosely pivotally mounted in a housing on an axle disposed through one end of said striker;

a housing having at least two parallel planar sides, each provided along the inner surface thereof with a plurality of bell-curve shaped protrusions arranged in a staggered manner in arcs opposed to one another on each side of the plane of motion of said arcually moveable striker, said arcs being roughly concentric with the arc of movement of said arcually moveable striker;

said axle mounted in said housing roughly perpendicular to both parallel sides of said housing and disposed through said parallel sides of said housing at a point which is concentric with the arcs in which said plurality of bell-curve shaped protrusions are arranged;

a pull line attached to said arcually moveable striker for remotely actuating said striker;

a spring affixed to said housing and said arcually moveable striker for returning said striker to its original position after actuation;

a bracket having adjustable straps for attaching said bracket to a fixed object and having a fixed pintle thereon in pivoting engagement with gudgeon holes on said housing for allowing said housing to aline itself with the direction of pull of said pull line.

* * * * *